(12) United States Patent
Thubert et al.

(10) Patent No.: US 11,902,161 B1
(45) Date of Patent: Feb. 13, 2024

(54) VIRTUAL NETWORK FOR VIRTUAL PHONE APPLICATIONS

(71) Applicant: Cisco Technology, Inc., San Jose, CA (US)

(72) Inventors: Pascal Thubert, Roquefort-les-Pins (FR); Eric Voit, Bethesda, MD (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/820,448

(22) Filed: Aug. 17, 2022

(51) Int. Cl.
| G06F 15/16 | (2006.01) |
| H04L 45/745 | (2022.01) |
| H04L 41/12 | (2022.01) |
| H04L 45/44 | (2022.01) |

(52) U.S. Cl.
CPC ............ *H04L 45/745* (2013.01); *H04L 41/12* (2013.01); *H04L 45/44* (2013.01)

(58) Field of Classification Search
CPC ........ H04L 41/12; H04L 45/44; H04L 45/745
USPC ......................................................... 709/238
See application file for complete search history.

(56) References Cited

U.S. PATENT DOCUMENTS

| 6,163,532 | A * | 12/2000 | Taguchi | H04W 8/26 455/554.1 |
| 9,870,248 | B2 * | 1/2018 | Tsirkin | G06F 12/1009 |
| 10,230,633 | B2 * | 3/2019 | Leitner | H04L 49/70 |
| 10,536,482 | B2 * | 1/2020 | Gabaev | H04L 63/1425 |
| 10,862,758 | B2 * | 12/2020 | Sethi | H04L 41/0823 |
| 11,463,355 | B2 * | 10/2022 | Kreger-Stickles | H04L 49/70 |
| 11,588,708 | B1 * | 2/2023 | Miriyala | H04L 41/22 |
| 2013/0107748 | A1 | 5/2013 | Dravida et al. | |
| 2017/0212864 | A1 * | 7/2017 | Leitner | H04L 49/9063 |
| 2021/0288898 | A1 | 9/2021 | Shen et al. | |
| 2022/0007283 | A1 | 1/2022 | Vleugels et al. | |
| 2022/0053405 | A1 | 2/2022 | Wang et al. | |
| 2022/0103466 | A1 | 3/2022 | Cai et al. | |
| 2022/0182301 | A1 * | 6/2022 | Shilimkar | H04L 41/0663 |
| 2022/0417113 | A1 * | 12/2022 | Lohiya | H04L 67/10 |
| 2023/0146525 | A1 * | 5/2023 | Ball | H04L 41/0895 370/392 |
| 2023/0164076 | A1 * | 5/2023 | Dawani | H04L 12/4641 709/238 |

* cited by examiner

*Primary Examiner* — Moustafa M Meky
(74) *Attorney, Agent, or Firm* — Merchant & Gould P.C.

(57) ABSTRACT

A device for a virtual phone in a virtual network may be provided. A data packet may be received by the device, the device being in a personal-area-network (PAN) with a peer, the data packet containing information defining a characteristic of a software application. The data packet may be profiled, the data packet comprising information about the software application. An SLA table stored on the device may be seeded with the information in the data packet. A routing table may be populated with an address for forwarding the information to the peer.

20 Claims, 3 Drawing Sheets

VIRTUAL NETWORK FOR VIRTUAL PHONE APPLICATIONS

TECHNICAL FIELD

The present disclosure relates generally to virtual networks, and more particularly to virtual networks for virtual phone applications.

BACKGROUND

Today, device manufacturers typically packaged devices such as phones, cameras, displays, sensors in a single housing together with voice processing applications, video processing applications, and other applications, and a monolithic OS. The requirement to consolidate components of a device or system in a single house limits the design of these devices. Additionally, when a user wants to upgrade part of the device or a component of the device fails, the user is required to replace the entire device.

Security is also an issue with these devices. Most of the devices are loaded with application software that connects either directly to other devices such as a point-of-sale (POS) terminal at a retailer or to the Internet. However, the user cannot be certain that such devices or Internet connection are secure. There is a risk of malware, viruses, spyware, or other damaging or fraudulent code being downloaded to the device.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A device for a virtual phone in a virtual network may be provided. A data packet may be received by the device, the device being in a personal-area-network (PAN) with a peer, the data packet containing information defining a characteristic of a software application. The data packet may be processed to identify information about the software application. An SLA table stored on the device may be seeded with the information in the data packet. A routing table may be populated with an address for routing or otherwise forwarding the information to the peer.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Components of devices such as phones are components of multiple subsystems can be physically separated from one another and then included in a wireless personal-area network (PAN) around a user. For example, phone can be disaggregated into physically separate components. One or more of the CPU and radio, the microphone, the speaker, and haptic sensors can be separated into physically separate housing that are remote from one another. Separating the components enable a user to switch individual components instead of the whole device, adapt a device to the user's preferences, adapt the device for different applications and uses, and the like.

Some wearable components could be static and other replaceable components could be discovered in the environment. Examples of replaceable subsystems include mikes, pens, cameras, speakers, display, haptic controls, conferencing system, gaming system, room lighting, and other components.

Figure 1:
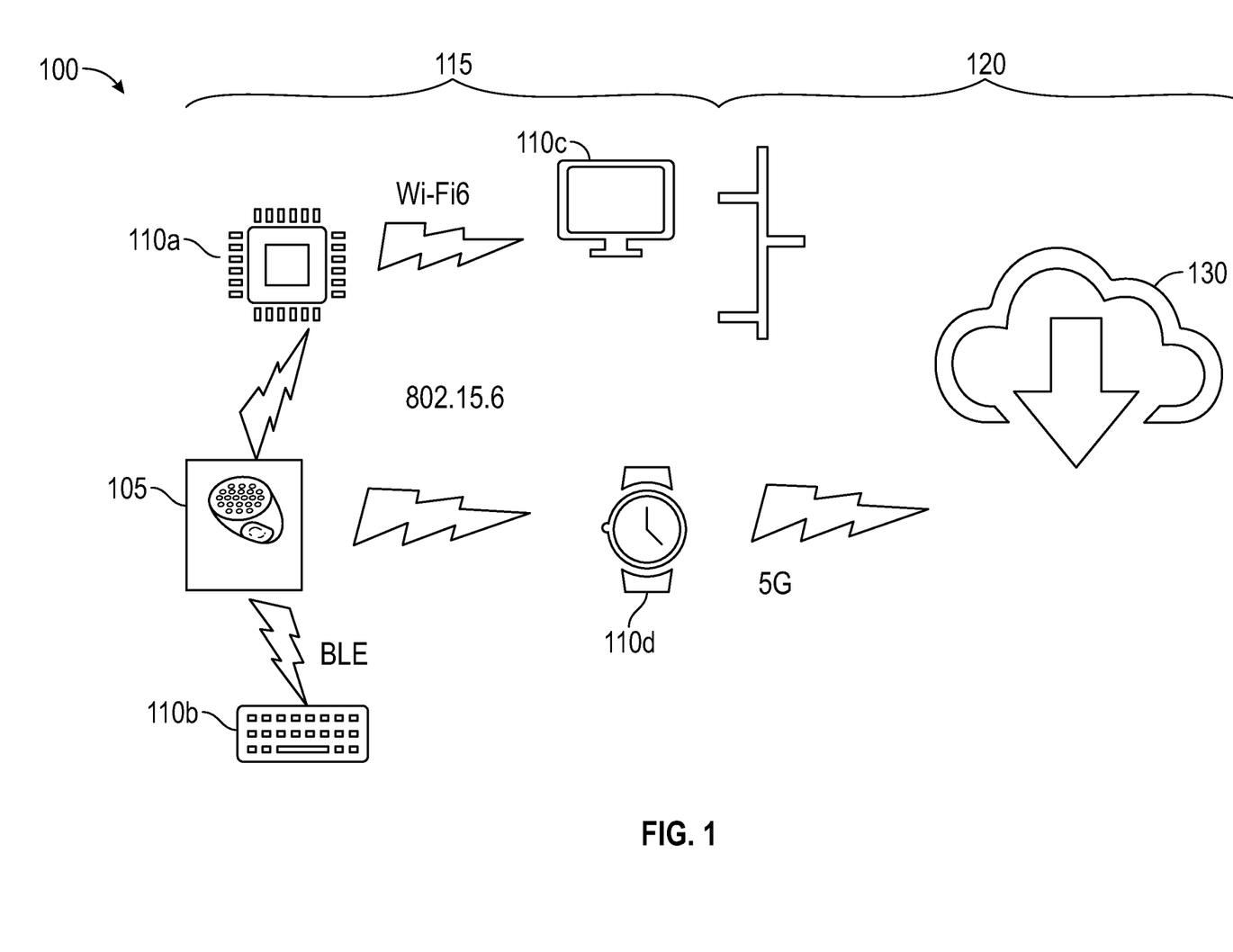
FIG. 1 illustrates a disaggregated device.

FIG. 1 illustrates a disaggregated device 100. In operation, a disaggregated or distributed device 100 scans its environment and grabs components 110a, 110b to form a device such as a virtual phone in a PAN 115. There also may be a network OS that forms a wireless bus and operates the devices 110a, 110b in the PAN 115. In at least some embodiment, the disaggregated device 100 includes an individual device or component that forms a hub 105. The hub 105 can be a discrete device that the user can hide in a location such as a pocket or case. It also can include a discrete device such as a finger ring as shown in the illustration that can be approached to a new selected replaceable subsystem to create and later destroy a security association (e.g., over NFC) that can be used for communication between other devices in the disaggregated phone and the new subsystem (or a server that controls that remote system) over different communication links.

In at least some embodiments, the hub 105 connects all of the peer devices 110a, 110b in the PAN 115. The peer devices 110a, 110b can include devices such as radios for phones, keyboards, microphones, displays, haptic devices, memory, pens, cameras, GPS sensors, etc. Some of the devices 110a, 110b may be replaceable or even disposable. A user can form multiple virtual phones or other devices. For example, the user could have multiple avatars (e.g., @home, @work, @privacy) and a different virtual phone for each avatar. Additionally, the different devices 110a, 110b can include a different combination of peer devices and can be loaded with different applications and different data.

The disaggregated device 100 also may attach to one or more subsystems 110c, 110d for connectivity with the Internet 130. The attachment can be over wire, ultra-wide band (UWB) connections, Wi-Fi, mmwave, near-field communication (NFC), or by any other type of connectivity. Additionally, the internet connection can be a one hop or multi-hop (e.g., mesh) connection. The aggregated device 100 can be an Internet-of-things (IoT) mesh of subsystems, with one or more virtual networks connecting peer device 110a, 110b to each other and to the outside world through an external network 140 such as a local network (LAN), the Intent, or some other wide-area network (WAN).

The process of discovering peer devices or components in the PAN 115, discovering their relative location, peering with them, and optimizes the user/application experience for the disaggregated device. The disaggregated virtual device 100 may dynamically maintain a list of active devices and the roles they support (e.g., microphone, speakers, screen, keyboard, biometric input, location sensing, etc.). This process will understand elements under direct control (e.g., a smartphone speaker) and those where multiple controllers might petition for use (e.g., a Bluetooth stereo in a car with multiple people vying for control,), or share (e.g., a gaming platform), Peering will continuously and dynamically select the appropriate set of devices 110a, 110b based on criteria such as pre-configured dependencies. For example, if a virtual (VR) headset is used, both video and audio streams must go there. The appropriate set of devices 110a, 110b also may be selected based on the last known states used for each peer device. Another criterion for peering may be signaling from a device such when a peer device 110a, 110b powers on, or when a peer device 110a, 110b sends a control message such as a "use me now" message or instruction. Additionally, the discovery of things that can negatively affect performance such as negative feedback loops can cause the disaggregated device 100 to drop a connection to a peer device 110a, 110b. For example, a speaker can be dropped from the PAN 100 if speaker audio found to be looping back through the microphone.

In various embodiments, sensors can be located in or attached to clothes, located in or attached to jewelry, attached directly to a user's body, or even implanted in a user's body. Additionally, in some possible embodiments, as user approaching a screen can cause the screen to become the screen of use, including smart glasses, so the disaggregated device needs to be able to continuously form and modify its list of peer devices 110a, 110b and update the PAN 115 accordingly.

A disaggregated device can include one or more power supplies. Some peer devices 110a, 110b can have their own battery. Examples include pacemakers, environments like a screen on the wall, 5G access in a watch, or a jewel. Other devices scavenge energy from radio wave, solar radiations, the movements, and heat of the body. Yet other devices can be wired. For example, power and networking wires can be embedded in the fabric of wearables.

The applications that run on the aggregated device may have different needs. And there are different appliances that can be bound to the disaggregated device to provide Internet connectivity, each with different capabilities and security postures.

At least some of the methods and system described herein focus on how to locate and network the devices 110c, 110d that provide egress connectivity to egress devices or remote peers. The network device 110c, 110d can include a profiler and/or classifier for processing data packets being delivered to the peer device 110a, 110b from a network 120 outside the PAN 115. Examples of egress connectivity include 5G radio, a screen that has ethernet backhaul, the NFC-capable wireless power station embedded in a keyboard, and the like. In alternative embodiments, the profiler and/or classifier can be loaded on and executed by the peer devices 110a, 110b, As discussed herein with reference to FIG. 1 the disaggregated device 100 forms a body or personal area network (PAN). The disaggregated device 100 may be associated with a user's identity. The disaggregated device may include a central device or hub and one or more peer devices, some of which may be an independent peripheral. At least some of the peer devices may support a mix of link layer communications technologies that interface outside the PAN. Examples of link layer technology includes satellite, 3GPP (5G), WLAN, WPAN, WBAN, Ethernet LAN, Bluetooth, NFC, and even nanoscale.

The PAN has a bandwidth that externally facing devices share and use to communicate outside the PAN. Where multiple links supporting IP connectivity are available, a user may expect the PAN to have "SD-WAN like network behavior." Each application and peer device can have its service-level agreements (SLA) balanced and respected. The result is IP reachability outside the PAN for each application and peed device may be orchestrated within the PAN. Traffic then may be addressed and directed as appropriate.

Existing SD-WAN algorithms can be applied to the disaggregated device and its peer devices when they share a bandwidth. Examples of SD-WAN algorithms include reachability on a path at a certain bandwidth, optimal usage of all available bandwidth, application visibility, and application steering control. Additionally, new packet forwarding considerations and metrics for the disaggregated device beyond those common in SD-WAN algorithms. For example, available batteries may be considered and optimized when orchestrating which outside-PAN link to use. In another example, an application might demand that a specific peer used for a next hop during network communication. For example, an application might demand video be displayed on a determined display or a document be sent to a determined printer.

Additionally, the security models for a network and networked devices changes as the distance between wireless peers gets smaller. These changing security models open security holes that can put the network and networked devices at risk for harm. For example, when a user taps a phone using NFC to pay for your groceries at a POS terminal, The user has no way of knowing whether the POS terminal is compromised.

An example solution that addresses these problems connectivity and security problems associated with disaggregated devices that are configured to access devices and networks outside of the disaggregated device's PAN includes using SD-WAN like metrics within the PAN to optimally steer application flows coming from outside the PAN. Another example is defining metrics so that a specific link will be traversed for an application only when next-hop security conditions are met. For example, a tunnel can be established for an application for confidential communication, and communication can use a mutually authenticated secure channel when communications use a protected key.

Figure 2:
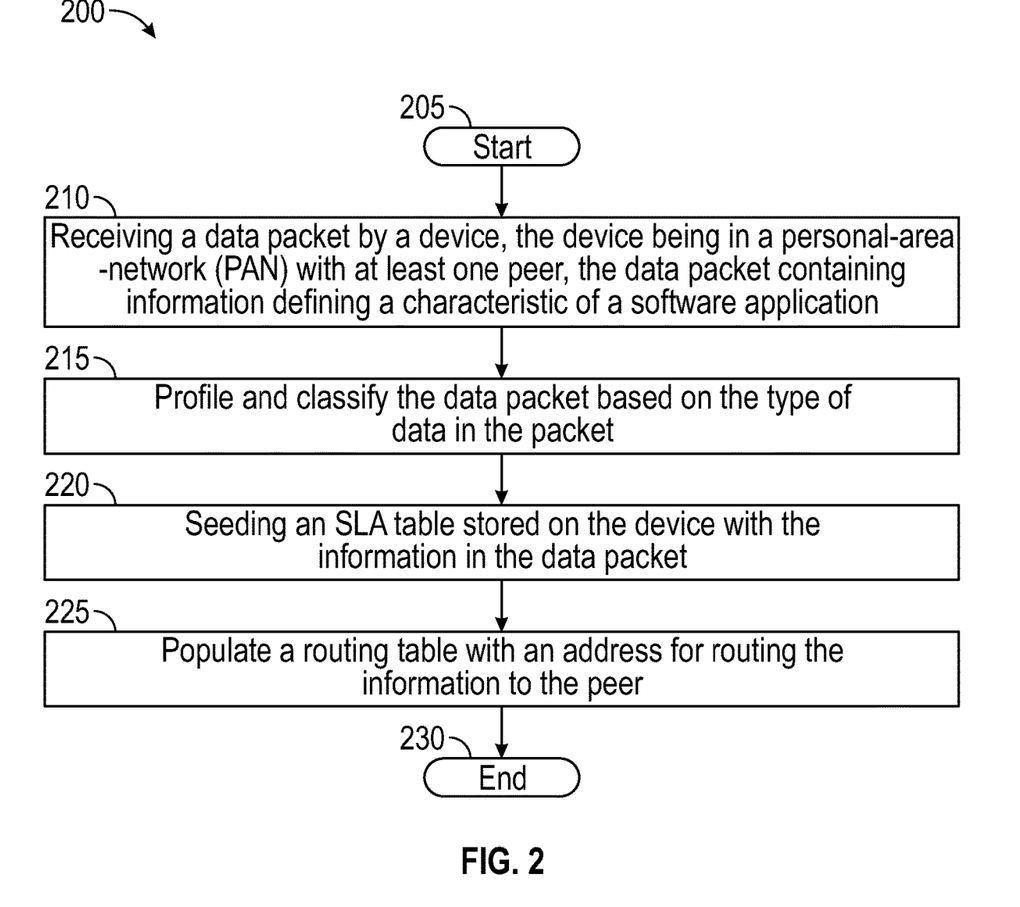
FIG. 2 is a flowchart illustrating a process of operating the disaggregated device shown in FIG. 1.

FIG. 2 is an environment for a routing table exchange within the devices/applications of a PAN, the routing table allowing those applications and peer devices to steer traffic to the most appropriate egress link of the PAN based. Traffic can be steered based on a combination of one or more of application, reachability, available bandwidth and any incremental pricing, power utilization, locality, next hop application identity, attested remote device identity, advertised as an extension to the routing protocol, each used to build different abstract routing tables for different optimizations. Referring now to FIG. 2, a process starts at operation 205. A data packet is received by a device, the device being in a personal-area-network (PAN) with a peer, the data packet containing information defining a characteristic of a software application. Operation 210. The data packets are profiled and classified based on the type of data in the packet. Operation 215.

An SLA table stored on the device is seeded with information in the data packet. Operation 220. A routing table is populated with an address for forwarding the information to one or more peers. Operation 225. In an example embodiment, the routing table is forwarded to each peer across which application traffic will traverse. In at least some embodiments, there is topology convergence, which may increase efficiency of data transfer in the PAN. In alternative embodiments, there is no topology convergence, or only partial topology convergence, in the PAN.

In at least some embodiments, population of the routing table is performed according to the classification of the data/data packet. In an example embodiment, the SLA table and routing table are integrated into a single table. An advantage of this embodiment is at least part of the forwarding selection criteria can include information in the SLA table. In an alternative embodiment, the SLA table and the routing table are separate tables that are bound, coupled, or linked together. This embodiment enables the SLA table and routing table to be more easily forwarded together. Forwarding can include routing, sending, or otherwise communicating information. Additionally, peers in the PAN can be interconnected using any suitable layer, and in some embodiments they can be interconnected using two or more layers. Forwarding can be performed along any suitable layer. For example, routing can be performed over layers 2, L2R, 3, or 5. In at least some example embodiments, two or more different forwarding techniques can be used for communication. The packets can be tagged with SLA information that will affect the routing selection, e.g., requested bounded latency, or energy conservation, which will map in different routing tables between those that can reach the destination.

In at least some example embodiments of this process, PAN egress devices seed an application SLA table if they can support the application. Many options exist for this embodiment including Cisco® branded SD-WAN Application Aware Routing, a Cloud SaaS Application List, and Cisco SAF identities. In these embodiments, the default applications could be "internet access." At least some embodiments also automatically learn the applications that are supported by the egress device via a link-layer protocol to the next hop or that are supported by a tool such as vManage.

Additionally, characteristics for each application supported by the peer or egress device are acquired. Examples of characteristics that can be acquired include: (i) addressing or reachability beyond the PAN for that link; (ii) link-layer technology used such as IEEE 802.11, NFC, 5G, or satellite; (iii) the bandwidth available to that application from the link egressing the PAN; (iv) available power (e.g., remaining time before the power source is drained); (v) a verifiable identity (e.g., AS, SUDI, attested application ID, developer of the remote software) of the peer or egress device; (vi) a location of the peer or egress device (e.g., GPS, mDNS, etc.). In at least some embodiments, characteristics can be continuously updated such as for bandwidth, potential bandwidth limits, costs, pricing constraints such as data charges for 5G or satellite, and the like.

In at least some embodiments, characteristics for an application can be acquired or updated automatically and with zero-operational-touch. Additionally, not all applications may be permitted on a given link. As a result, restricted applications and peer devices might drive the characteristics. For example, one WiFi SSID can be used for connecting Chromecast to a TV and a different WiFi SSID can be used for guest access to the Internet. Other embodiments use alternative orchestration to communicate application characteristics to and from peer devices and egress devices. Additionally, acquiring the application characteristics may be centrally controlled with a tool such as vManage, which is commercially available from Cisco.

The peer devices in the PAN store a routing table having an address for forwarding the information populated in the SLA table to another device in the PAN. The routing table can store a different set of address for each application. For example, the routing table can store one set of addresses for one application and a different set of address for a different application. Alternatively, a peer device can include multiple routing tables, one for each of the applications. A routing protocol within the devices in the PAN exchanges the application characteristics discussed above with one or more of the other peer devices in the PAN as addressed in the routing tables. This exchange of application characteristics between peer devices in the PAN results in a distributed forwarding/routing table per application maintained across peer devices in the PAN.

Applications and peer devices that directly interface with the user or an egress device can see any available alternative egress devices and alternative next hops for communicating with the egress device. Additionally, the applications know which link layer types are allowed, and mandatory encryption options for the application to traverse that link. They can see the hardware identities remote side to allow a permit for a next hop. The application can address and steer traffic to the best next hop. This functionality enables application characteristics and routing information to be synchronized between peer devices in the PAN that might touch known applications.

Additionally, for each egress device, a topology for routing protocol for low-power and lossy networks (RPL) is formed with the egress device as root. RPL can be extended to make known to other peer devices the capabilities of the upstream connectivity via the egress device. For a new application with a particular need, an egress device is selected, and if necessary, a new RPL instance is formed with an objective function that matches the application needs. In at least some embodiments, there can be one topology for each application.

For time sensitive flows, a schedule and reservations can be associated to each topology. For example, RPL can indicate the topology in an extension header for IPv6 hop-by-hop. The application flows are bound to a socket that places data packets over a topology.

Additionally, one or more RPL DODAGs can be built for each border router that serves as a root to the DODAGs and for connecting to egress devices. DIO messages are augmented to express the constraints (e.g., accepted flows, required authentication) and capabilities (e.g., which VPN if any, bandwidth, latency, load) on the outside connection. A data intelligence offensive network (DIO) also can be used to augment the application to provide matching service level objectives to the stack so the stack can select the appropriate DODAG for a flow based on matching policies.

As an example of flow acceptance, a root may accept only traffic profiles that match policies that an application stack on a peer device is aware of. The acceptance can be based on 5/6 tuple matching in the IP/transport. This also can be a committed information rate, diffserv per-hop behavior signaled by QoS levels, and deterministic vs. not.

As an example of required authentication, an application must pass through an authentication process that the root can validate. The needed authentication process can be indicated in the DIO, and the proof that the authentication process was passed successfully can be indicated in all packets. Examples of such an indication include a tag (e.g., ISE), a signature (e.g., a key obtained through the authentication process), and an encapsulation (e.g., application stack to root). At least some embodiments of an authentication process can be leverage of the root as a join proxy to join the outside network with some EAP using a protocol IETF PANA (RFC 5191), 6TiSCH minimal security (RFC 9031), or 0.1x over VxLAN between the app device and the root.

Examples of capabilities include reliability stats, throughput stats, reachability information (e.g., accessing an IPv6 ULA range or a list of services), security level (joining APN X or VPN), guaranteed SLOs like latency and jitter between the root and specific destinations (e.g., AWS or a service hosted on-premise), and available bandwidth.

Examples of SLOs requirements that can be passed by the app to an application stack include deterministic vs. stochastic, latency, jitter, throughput, bursty-ness, average rate, flow identification (6 tuple), and reliability requirements (e.g., max losses in a row, X 9's).

Figure 3:
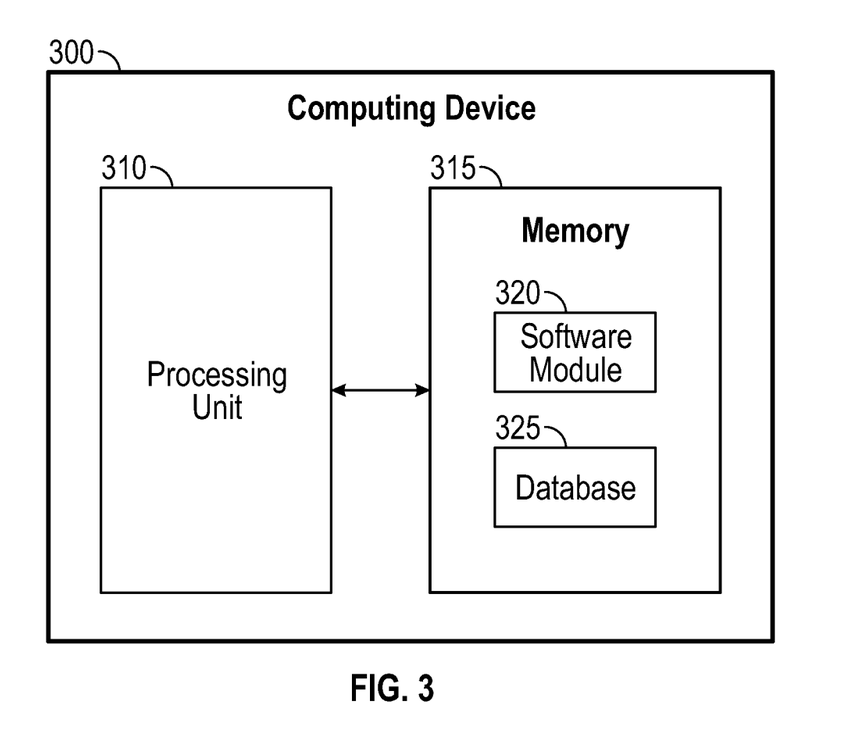
FIG. 3 is block diagram illustrating a computing device that can be used in the disaggregated device shown in FIG. 1.

FIG. 3 shows a computing device 300 that can be used in peers of a disaggregated device such as a phone. As shown in FIG. 3, computing device 300 may include a processing unit 310 and a memory storage 315. Each peer device or other device in the PAN may include a computing device 300. Egress or remote peers also may include a computing device 300.

Memory storage 315 may include a software module 320 and a database 325. The memory storage 315 may further include applications, SLA tables, RPL topologies, and router tables. While executing on processing unit 310, software module 320 may perform, for example, processes for seeding or populating SLA tables, populating router tables, receiving and delivering data packets, extracting data and information from data packets, generating and routing protocols, generating RPL topologies, processing application characteristics.

Computing device 300 may comprise any computer operating environment suitable for use in or for interfacing with peers in a disaggregated device or its PAN. Examples of peer are disclosed in more detail herein. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The methods, systems, computer-readable medium disclosed herein have many aspects including the following.

One aspect is a system comprising a disaggregated phone. The device comprising a peer, the peer being in a personal area network (PAN), the device comprising a memory storage and a processing unit disposed in a station, the processing unit in data communication with the memory storage, wherein the memory storage stores a service-level agreement (SLA) table and a routing table; and the processing unit is operative to receive a data packet containing information defining a characteristic of a software application, profile/retag the data packet, seed the SLA table with the information in the data packet, and populate a routing table with an address for forwarding the information to another device across which application traffic will pass in the PAN.

Another aspect is a system, alone or in any combination with the previous embodiments and aspects disclosed wherein, wherein the information populating the SLA table comprises at least one of: an address for accessing applications outside the PAN, a link layer for a component, bandwidth available to the software application, available power for the component, a verifiable identity of the peer remote to the PAN, a location of the peer remote to the PAN, and combinations thereof.

Another aspect is a system, alone or in any combination with the previous embodiments and aspects disclosed wherein, the memory storage stores a routing protocol, the routing protocol identifying the peer as a destination for delivering information in the SLA table from the device; and the processing unit is operative to communicate at least some of the information in the SLA table to the peer identified in the routing table.

Another aspect is a system, alone or in any combination with the previous embodiments and aspects disclosed wherein, the processing unit is operative to determine an RPL topology, the RPL topology defining the device as a root device.

Another aspect is a system, alone or in any combination with the previous embodiments and aspects disclosed wherein, the processing unit is operative to determine at least first and second RPL topologies, the first RPL topology for a first software application, and the second RPL topology is for a second software application.

Another aspect is a system, alone or in any combination with the previous embodiments and aspects disclosed wherein, the first RPL topology defines the device as a first root device for the first software application, and the second RPL topology defines the peer as a second root device for the second software application.

Another aspect is a system, alone or in any combination with the previous embodiments and aspects disclosed wherein the SLA table and the routing table are integrated into a single table.

Another aspect is a system, alone or in any combination with the previous embodiments and aspects disclosed wherein the device comprises at least first and second peers; and the processing unit is further operative to selectively execute a first software application to control at least the first and second peers as a first phone or execute a second software application to control at least the first and second peers as a second phone.

Another aspect is a system, alone or in any combination with the previous embodiments and aspects disclosed wherein the device comprises a plurality of peers; and the processing unit is further operative to control a first set of peers in the plurality of peers as a first phone and a second set of peers in the plurality of peers as a second phone.

Another aspect is a system, alone or in any combination with the previous embodiments and aspects disclosed wherein the device comprises at least first and second peers; and the processing unit is further operative to communicate the information from the first peer to the second peer only upon defined security conditions being met.

Another aspect is a method comprising, alone or in any combination with the previous embodiments and aspects disclosed wherein: receiving a data packet by a device, the device being in a personal-area-network (PAN), the device comprising a peer, the data packet containing information defining a characteristic of a software application; processing the data packet, the data packet comprising information about the software application; seeding an SLA table stored on the device with the information in the data packet; and populating a routing table with an address for forwarding the information to the peer.

Another aspect is a method, alone or in any combination with the previous embodiments and aspects disclosed wherein, the information populating the SLA table comprises at least one of: an address for accessing applications outside the PAN, a link layer a component, bandwidth available to the software application, available power for the component, a verifiable identity of the peer remote to the PAN, a location of the peer remote to the PAN, and combinations thereof.

Another aspect is a method, alone or in any combination with the previous embodiments and aspects disclosed, further comprising delivering information in the SLA table from the device to the peer at the address stored in the routing table.

Another aspect is a method, alone or in any combination with the previous embodiments and aspects disclosed, further comprising determining an RPL topology, the RPL topology defining the device as a root device.

Another aspect is a method, alone or in any combination with the previous embodiments and aspects disclosed further comprising, determining at least first and second RPL topologies, the first RPL topology for a first software application, and the second RPL topology is for a second software application.

Another aspect is a method, alone or in any combination with the previous embodiments and aspects disclosed wherein, the first RPL topology defines the device as a first root device for the first software application, and the second RPL topology defines the peer as a second root device for the second software application.

Another aspect is a method, alone or in any combination with the previous embodiments and aspects disclosed wherein the SLA table and the routing table are integrated into a single table.

Another aspect is a method, alone or in any combination with the previous embodiments and aspects disclosed, further comprising selectively executing a first software application to control at least the first and second peers as a first phone; or selectively executing a second software application to control at least the first and second peers as a second phone.

Another aspect is a method, alone or in any combination with the previous embodiments and aspects wherein the device comprises a plurality of peers, the method further comprising controlling a first set of peers in the plurality of peers as a first phone and a second set of peers in the plurality of peers as a second phone.

Another aspect is a method, alone or in any combination with the previous embodiments and aspects disclosed further comprising Another aspect is a method, alone or in any combination with the previous embodiments and aspects, wherein the PAN comprises at least first and second peers, and the method further comprising communicating the information from the first peer to the second peer upon defined security conditions being met.

Another aspect is a computer-readable medium that stores a set of intransient instructions, alone or in any combination with the previous embodiments and aspects disclosed herein, which when executed perform a method executed by the set of instructions comprising receiving a data packet by a device, the device being in a personal-area-network (PAN) with a peer, the data packet containing information defining a characteristic of a software application; processing the data packet, the data packet comprising information about the software application; seeding an SLA table stored on the device with the information in the data packet; and populating a routing table with an address for forwarding the information to the peer.

Another aspect is a computer-readable medium that stores a set of intransient instructions, alone or in any combination with the previous embodiments and aspects disclosed herein, wherein the information populating the SLA table comprises at least one of: an address for accessing applications outside the PAN, a link layer for a component, bandwidth available to the software application, available power for the component, a verifiable identity of the peer remote to the PAN, a location of the peer remote to the PAN, and combinations thereof.

Another aspect is a computer-readable medium that stores a set of intransient instructions, alone or in any combination with the previous embodiments and aspects disclosed herein, which when executed perform a method executed by the set of instructions comprising delivering information in the SLA table from the device to the peer at the address stored in the routing table.

Another aspect is a computer-readable medium that stores a set of intransient instructions, alone or in any combination with the previous embodiments and aspects disclosed herein, which when executed perform a method executed by the set of instructions comprising determining an RPL topology, the RPL topology defining the device as a root device.

Another aspect is a computer-readable medium that stores a set of intransient instructions, alone or in any combination with the previous embodiments and aspects disclosed herein, which when executed perform a method executed by the set of instructions comprising determining at least first and second RPL topologies, the first RPL topology for a first software application, and the second RPL topology is for a second software application.

Another aspect is a computer-readable medium that stores a set of intransient instructions, alone or in any combination with the previous embodiments and aspects disclosed herein, wherein the first RPL topology defines the device as a first root device for the first software application, and the second RPL topology defines the peer as a second root device for the second software application.

Another aspect is a computer-readable medium that stores a set of intransient instructions, alone or in any combination with the previous embodiments and aspects disclosed herein, which when executed perform a method executed by the set of instructions comprising selectively executing a first software application to control at least the first and second peers as a first phone; or selectively executing a second software application to control at least the first and second peers as a second phone.

Another aspect is a computer-readable medium that stores a set of intransient instructions, alone or in any combination with the previous embodiments and aspects disclosed herein, which when executed perform a method executed by the set of instructions comprising controlling a first set of peers in the plurality of peers as a first phone and a second set of peers in the plurality of peers as a second phone.

Another aspect is a computer-readable medium that stores a set of intransient instructions, alone or in any combination with the previous embodiments and aspects disclosed herein, which when executed perform a method executed by the set of instructions comprising communicating the information from the first peer to the second peer upon defined security conditions being met.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A system comprising:
a device for a disaggregated phone, the device comprising a peer, the peer being in a personal area network (PAN), the device comprising a memory storage and a processing unit disposed in a station, the processing unit in data communication with the memory storage, wherein:
the memory storage stores a service-level agreement (SLA) table and a routing table; and
the processing unit is operative to receive a data packet containing information defining a characteristic of a software application, profile the data packet, seed the SLA table with the information in the data packet, and populate a routing table with an address for forwarding the information to another device across which application traffic will pass in the PAN.

2. The system of claim 1, wherein the information populating the SLA table comprises at least one of: an address for accessing applications outside the PAN, a link layer for a component, bandwidth available to the software application, available power for the component, a verifiable identity of the peer remote to the PAN, a location of the peer remote to the PAN, and combinations thereof.

3. The system of claim 2 wherein:
the memory storage stores a routing protocol, the routing protocol identifying the peer as a destination for delivering information in the SLA table from the device; and
the processing unit is further operative to communicate at least some of the information in the SLA table to the peer identified in the routing table.

4. The system of claim 1 wherein the processing unit is further operative to determine at least first and second RPL topologies, the first RPL topology for a first software application, and the second RPL topology is for a second software application.

5. The system of claim 4 wherein the first RPL topology defines the device as a first root device for the first software application, and the second RPL topology defines the peer as a second root device for the second software application.

6. The system of claim 1 wherein:
the device comprises at least first and second peers; and the processing unit is further operative to selectively execute a first software application to control at least the first and second peers as a first phone or execute a second software application to control at least the first and second peers as a second phone.

7. The system of claim 1 wherein:
the device comprises at least first and second peers; and
the processing unit is further operative to communicate the information from the first peer to the second peer only upon defined security conditions being met.

8. A method comprising:
receiving a data packet by a device, the device being in a personal-area-network (PAN), the device comprising a peer, the data packet containing information defining a characteristic of a software application;
processing the data packet, the data packet comprising information about the software application;
seeding an SLA table stored on the device with the information in the data packet; and
populating a routing table with an address for forwarding the information to the peer.

9. The method of claim 8, wherein the information populating the SLA table comprises at least one of: an address for accessing applications outside the PAN, a link layer for a component, bandwidth available to the software application, available power for the component, a verifiable identity of the peer remote to the PAN, a location of the peer remote to the PAN, and combinations thereof.

10. The method of claim 9 further comprising delivering information in the SLA table from the device to the peer at the address stored in the routing table.

11. The method of claim 10 further comprising determining an RPL topology, the RPL topology defining the device as a root device.

12. The method of claim 11 wherein the first RPL topology defines the device as a first root device for the first software application, and the second RPL topology defines the peer as a second root device for the second software application.

13. The method of claim 8 further comprising:
selectively executing a first software application to control at least first and second peers as a first phone; or
selectively executing a second software application to control at least the first and second peers as a second phone.

14. The method of claim 8 wherein the PAN comprises at least first and second peers, the method further comprising communicating the information from the first peer to the second peer upon defined security conditions being met.

15. A non-transitory computer-readable medium that stores a set of intransient instructions which when executed perform a method executed by the set of instructions comprising:
receiving a data packet by a device, the device being in a personal-area-network (PAN) with a peer, the data packet containing information defining a characteristic of a software application;
processing the data packet, the data packet comprising information about the software application;
seeding an SLA table stored on the device with the information in the data packet; and
populating a routing table with an address for forwarding the information to the peer.

16. The non-transitory computer-readable medium of claim 15, wherein the information populating the SLA table comprises at least one of: an address for accessing applications outside the PAN, a link layer for a component, bandwidth available to the software application, available power for the component, a verifiable identity of the peer remote to the PAN, a location of the peer remote to the PAN, and combinations thereof.

17. The non-transitory computer-readable medium of claim 16 further comprising delivering information in the SLA table from the device to the peer at the address stored in the routing table.

18. The non-transitory computer-readable medium of claim 15 further comprising determining an RPL topology, the RPL topology defining the device as a root device.

19. The non-transitory computer-readable medium of claim 15 further comprising determining at least first and second RPL topologies, the first RPL topology for a first software application, and the second RPL topology is for a second software application.

20. The non-transitory computer-readable medium of claim 19 wherein the first RPL topology defines the device as a first root device for the first software application, and the second RPL topology defines the peer as a second root device for the second software application.

* * * * *